United States Patent [19]

Liang

[11] Patent Number: 5,798,040
[45] Date of Patent: Aug. 25, 1998

[54] WATER PURIFICATION CARTRIDGE ASSEMBLY WITH UNIDIRECTIONAL FLOW THROUGH FILTER MEDIA

[75] Inventor: Li-Shiang Liang, Harvard, Mass.

[73] Assignee: United States Filter Corporation, Palm Desert, Calif.

[21] Appl. No.: 598,818

[22] Filed: Feb. 9, 1996

[51] Int. Cl.$^6$ .......................... B01D 24/12; B01D 24/14
[52] U.S. Cl. .................. 210/232; 210/252; 210/288; 210/289
[58] Field of Search .................. 210/282, 232, 210/279, 288, 289, 291, 252, 259, 323.2, 335, 341

[56] References Cited

U.S. PATENT DOCUMENTS

| | | | |
|---|---|---|---|
| 526,695 | 10/1894 | Emery | 210/341 |
| 844,438 | 2/1907 | Bayley | 210/341 |
| 1,942,584 | 1/1934 | Weinstein | 210/132 |
| 2,278,488 | 4/1942 | Ralston | 210/24 |
| 2,391,716 | 12/1945 | Koupal | 210/130 |

(List continued on next page.)

FOREIGN PATENT DOCUMENTS

| | | |
|---|---|---|
| B-38330/85 | 7/1986 | Australia . |
| 982779 | 2/1976 | Canada . |
| 296 043 | 12/1988 | European Pat. Off. . |
| 0 533 381 A2 | 3/1993 | European Pat. Off. . |
| 0 598 249 | 5/1994 | European Pat. Off. . |
| 2216230 | 2/1974 | France . |
| 19 33 745 | 1/1971 | Germany . |
| 20 53 551 | 5/1972 | Germany . |
| 2 355 178 | 5/1974 | Germany . |
| 25 55 178 | 6/1977 | Germany . |
| WO 93/00976 | 1/1993 | WIPO . |

OTHER PUBLICATIONS

Enviro–Systems Corp. (Los Angeles, CA); ESC Brochure with Distributor & OEM Product List Mar. 1996.

Ionics, Incorporated (Bridgeville, PA); General Ionics® Reverse Osmosis/Activated Carbon Drinking Water Appliance—Advertisement—G.I. Series Drinking Water System# 1994.

Triangle Distributors Ltd. (Victoria, BC, Canada); H$_2$O Heads Up® Shower Filter—Advertisement 1995.

Marlo, Inc. (Racine, WI); Marlo RO–14C Reverse Osmosis Drinking Water System—Advertisement Mar. 1995.

Microline (Windsor, WI); Microline® Reverse Osmosis Systems for the World's Water, T.F.C.–35DF Reverse Osmosis System—Advertisement Mar. 1996.

*Primary Examiner*—Cynthia L. Nessler
*Attorney, Agent, or Firm*—Wolf, Greenfield & Sacks, P.C.

[57] ABSTRACT

The present invention provides a water purification cartridge with unidirectional fluid flow through the filter media. Preferably, the fluid flow is down through the media to prevent fluidization of the media which can have a negative effect on the capacity of the filter cartridge to filter fluid. A cartridge assembly includes a plurality of cartridge units. Each cartridge unit has a bottom cap and a top cap. Preferably, the top cap includes the inlet and outlet ports for each cartridge unit. The fluid flows into the cartridge, down the filter media to the lower end and a bottom cap collects the filtered fluid and directs the fluid to a tube which extends from the lower end of the cartridge to the upper end. The tube is rigidly mounted at the top of the cartridge and slidingly mounted on the bottom of the cartridge. Additionally, a novel method of making a filter cartridge is disclosed.

6 Claims, 14 Drawing Sheets

U.S. PATENT DOCUMENTS

| | | | |
|---|---|---|---|
| 2,525,497 | 10/1950 | Monfried | 206/46 |
| 2,752,309 | 6/1956 | Emmons et al. | 210/24 |
| 2,809,753 | 10/1957 | Atkinson | 210/301 |
| 2,918,764 | 12/1959 | Dunlap | 210/282 |
| 3,155,612 | 11/1964 | Weber | 210/291 |
| 3,171,801 | 3/1965 | Rice et al. | 210/52 |
| 3,252,899 | 5/1966 | Rice et al. | 210/40 |
| 3,266,628 | 8/1966 | Price | 210/282 |
| 3,289,847 | 12/1966 | Rothemund | 210/282 |
| 3,382,169 | 5/1968 | Thompson | 210/32 |
| 3,396,847 | 8/1968 | Englesberg | 210/85 |
| 3,497,069 | 2/1970 | Lindenthal et al. | 210/282 |
| 3,554,377 | 1/1971 | Miller | 210/275 |
| 3,716,143 | 2/1973 | Clark | 210/321 |
| 3,753,495 | 8/1973 | Birok | 210/206 |
| 3,756,413 | 9/1973 | Gartner | 210/205 |
| 3,855,133 | 12/1974 | Roehsler | 210/490 |
| 3,909,402 | 9/1975 | Gartner | 210/27 |
| 3,914,176 | 10/1975 | Holmes | 210/132 |
| 3,950,253 | 4/1976 | Stern | 210/282 |
| 3,977,967 | 8/1976 | Trulson et al. | 210/23 |
| 3,985,648 | 10/1976 | Casolo | 210/38 B |
| 4,033,874 | 7/1977 | Marquardt et al. | 210/189 |
| 4,039,444 | 8/1977 | Bory et al. | 210/36 |
| 4,088,563 | 5/1978 | Marquardt | 210/33 |
| 4,105,562 | 8/1978 | Kaplan et al. | 210/232 |
| 4,118,317 | 10/1978 | Neeb et al. | 210/32 |
| 4,133,754 | 1/1979 | Bory et al. | 210/36 |
| 4,154,704 | 5/1979 | Vinton et al. | 252/444 |
| 4,160,738 | 7/1979 | Guter | 210/232 |
| 4,161,445 | 7/1979 | Coillet | 210/23 H |
| 4,182,676 | 1/1980 | Casolo | 210/27 |
| 4,184,893 | 1/1980 | Halvorson et al. | 134/25 R |
| 4,191,648 | 3/1980 | Kaplan et al. | 210/186 |
| 4,192,750 | 3/1980 | Elfes et al. | 210/133 |
| 4,196,081 | 4/1980 | Pavia | 210/94 |
| 4,233,158 | 11/1980 | Wachsmuth | 210/283 |
| 4,280,912 | 7/1981 | Berry, III et al. | 210/662 |
| 4,343,707 | 8/1982 | Lucas | 210/695 |
| 4,347,136 | 8/1982 | Friesen et al. | 210/253 |
| 4,367,150 | 1/1983 | Hiesinger et al. | 210/777 |
| 4,368,123 | 1/1983 | Stanley | 210/289 |
| 4,411,785 | 10/1983 | Yu et al. | 210/321.1 |
| 4,414,113 | 11/1983 | LaTerra | 210/636 |
| 4,430,226 | 2/1984 | Hegde et al. | 210/638 |
| 4,451,369 | 5/1984 | Sekino et al. | 210/321.1 |
| 4,522,717 | 6/1985 | Brust | 210/238 |
| 4,541,926 | 9/1985 | Stanley | 210/87 |
| 4,609,466 | 9/1986 | McCausland et al. | 210/244 |
| 4,615,800 | 10/1986 | Stifelman et al. | 210/132 |
| 4,636,307 | 1/1987 | Inoue et al. | 210/188 |
| 4,645,605 | 2/1987 | Durham | 210/679 |
| 4,647,375 | 3/1987 | Czeller et al. | 210/267 |
| 4,659,460 | 4/1987 | Muller et al. | 210/93 |
| 4,681,677 | 7/1987 | Kuh et al. | 210/88 |
| 4,693,820 | 9/1987 | Baxter | 210/282 |
| 4,693,823 | 9/1987 | Matchett | 210/266 |
| 4,698,164 | 10/1987 | Ellis | 210/282 |
| 4,786,420 | 11/1988 | Dalessandro | 210/791 |
| 4,818,398 | 4/1989 | Lott et al. | 210/238 |
| 4,826,594 | 5/1989 | Sedman | 210/266 |
| 4,851,122 | 7/1989 | Stanley | 210/501 |
| 4,894,154 | 1/1990 | Roz et al. | 210/266 |
| 4,944,875 | 7/1990 | Gaignet | 210/232 |
| 4,948,505 | 8/1990 | Petrucci et al. | 210/282 |
| 5,128,035 | 7/1992 | Clack et al. | 210/251 |
| 5,277,807 | 1/1994 | Lavoie et al. | 210/321 |
| 5,397,468 | 3/1995 | Chomka et al. | 210/284 |
| 5,399,263 | 3/1995 | Chomka et al. | 210/257.1 |
| 5,401,399 | 3/1995 | Magnusson et al. | 210/136 |

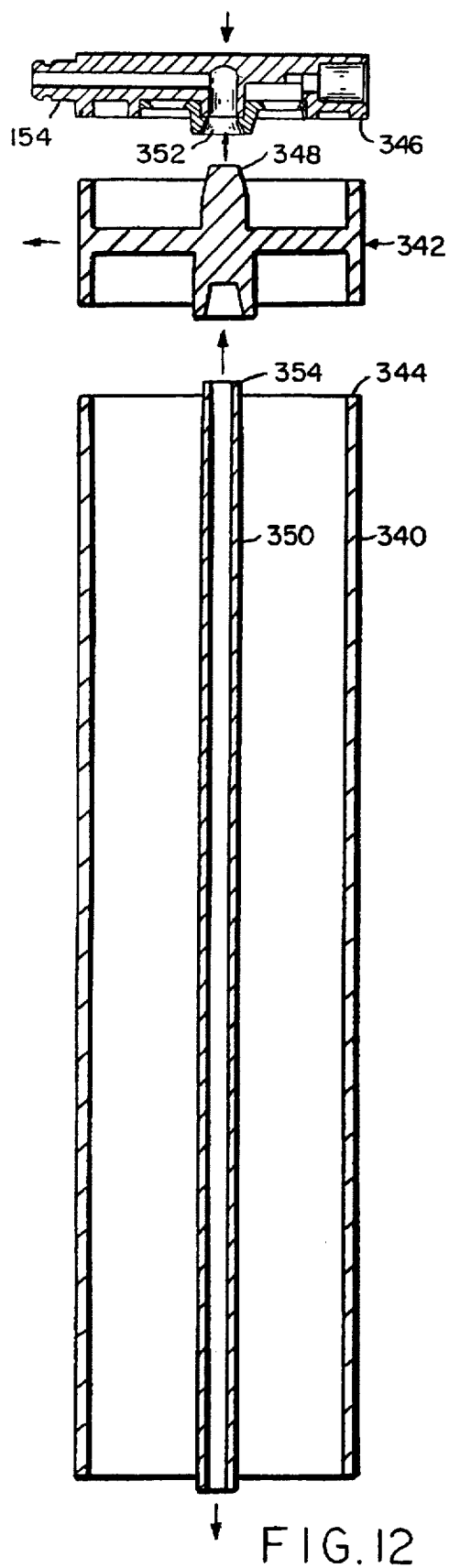
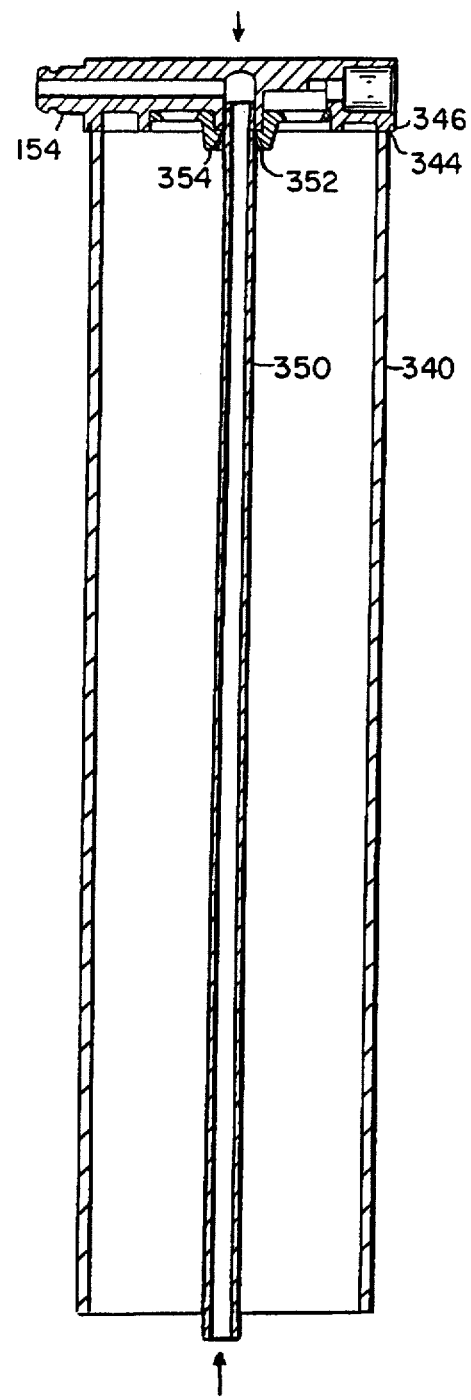
FIG.12
FIG.13

WATER PURIFICATION CARTRIDGE ASSEMBLY WITH UNIDIRECTIONAL FLOW THROUGH FILTER MEDIA

BACKGROUND OF THE INVENTION

1. Field of the Invention

This invention relates to a water purification cartridge having unidirectional flow through a filter media.

2. Description of Related Art

Purified water has been increasingly demanded in research and industry for various scientific testing and analysis. Many different filtration devices have been proposed and are in use to filter water into ultra-purified form which has a resistivity greater than 18 megohms-cm with a total organic compound (TOC) level of less than 20 parts per billion. The ultra-pure water is obtained by sequential treatment of water with charcoal, contact with mixed anionic and cationic resins and a microfilter. These or more filtration steps may be provided.

Various systems and techniques for obtaining the purified water have been proposed and are in use. Some water purification systems have permanent housings which are built into the unit and into which replaceable filter cells are located. Increasingly common, however, are removable cartridges that include both the housing and the filter media through which the water passes to obtain ultra-pure water. For example, Gaignet, in U.S. Pat. No. 4,944,875, issued Jul. 31, 1990, discloses one type of cartridge system that comprises tubes which contain water treatment media which are joined by two end plates. The end plates form manifolds which transfer the fluid from one cylinder to the next in serial flow. Additionally, the device is designed to be connected to a control unit containing a pump, valves and monitor measurement circuits by means of connectors. Some of the connectors provide the fluid connections between the cartridge and the control unit.

FIG. 1 illustrates a prior art device, which in some respects is similar to Gaignet, and shows a typical four tube cartridge assembly 30. Four tubes 32 are filled with water purification media 34. A pair of plates 36, 38 are disposed along the ends of the tubes and connect the tubes together to form the cartridge assembly. The end plates 36, 38 also form the manifold through which the fluid is directed from one tube into the next serially adjacent tube. As illustrated, water is pumped into the cartridge assembly through an inlet port 42, as indicated by arrow 44, and travels downwardly through a first tube 32 into the end plate 38. The water then flows through a passage 48 in the end plate 38 and into a second tube 32a in an upward direction as indicated by arrow 49 to the top end plate 36. Subsequently, the fluid flows through a passage 50 into a third tube and flows in a downward direction to the end plate 38 through the passage 52 and up through the fourth tube and out the outlet port 54. Thus, the prior art discloses a non-separable cartridge assembly having both downward and upward fluid flow as the fluid travels through the filter media.

The upward flow through the purification media is often not desirable. The media which is usually in the particulate form, may "fluidize" once fluid flow is established through the tube. This occurs when the upward force due to the water velocity exceeds the downward force (of gravity) on the media. The fluidization of the media that occurs may result in a reduced performance of the purifier. Additionally, such fluidization may result in mixing of purification media if more than one type of purification media is layered within a tube. This too may result in a decrease in purification performance. Because the upward flow of fluid is often not desired, various attempts have been made to provide for continuous downward flow for fluid purification devices. As illustrated in FIG. 2, an example of one such device includes a deionization device having two cylinders 62, 72 that are filled with filter media 64, 74, respectively. Fluid enters into cylinder 62 through port 66 and flows down through the filter media 64 to a screened collection basket 68 at the lower end of the cylinder. The fluid travels from the collection basket 68 upwardly through a product collection tube 70 and out of the cylinder 62. Optionally, the second cylinder 72 may be provided and the fluid may flow serially into the second cylinder, downward through water purification media into a collection basket 78 and upwardly through a tube 80. Thus, a plurality of cylinders are provided which allow for downward fluid motion in a plurality of cylinders. This particular arrangement is not a cartridge which can easily be replaced and typically are fixed in a system. Additionally, water does not flow through the filter media in the lower portion of the cylinders that lies below the collection basket. This wastes both filter media and space for the filter.

Accordingly, the prior art does not provide a convenient water purification cartridge assembly with separable cartridges which allows for unidirectional flow throughout the purification tubes.

SUMMARY OF THE INVENTION

The present invention provides a water purification cartridge with unidirectional flow through the filter media. The cartridge includes a cylindrical element that has first and second ends, the cylindrical element contains a filter media and is adapted to receive fluid flow therethrough. A first end cap is disposed on the first end of the cylindrical element and includes a fluid inlet port and a fluid outlet port, said inlet port is adapted to direct fluid into the cylindrical element to the filter media. A second end cap is disposed on a second end of the cylindrical element, the second end cap is adapted to receive the fluid passing through the filter media. Finally, a tube may be disposed within the cylinder to transfer the filtered fluid from the second end to the outlet port disposed at the first end.

In another aspect of the present invention, a first cartridge unit for filtering liquid is provided and includes a first end having an inlet and an outlet, the first cartridge is adapted to filter fluid flowing in a first direction. A second filter cartridge may be provided for filtering liquid, the second cartridge includes a first end having a fluid inlet, the fluid inlet of the second cartridge is fluidly connected to the outlet of the first cartridge and is adapted to filter in the first direction. In a preferred embodiment, the fluid flows axially downward through each of the cartridges. A plurality of cartridges may be used to form a cartridge assembly.

In another embodiment of the present invention, an apparatus for purifying fluid includes a cylindrical element having two ends and containing a filter media that is adapted to receive fluid flow therethrough. A first end cap is disposed on one end of the cylindrical element and includes a fluid inlet port and a fluid outlet port, said inlet port adapted to direct fluid into the cylindrical element and into the filter media. A second end cap is disposed on a second end of the cylindrical element, the second end is adapted to receive the fluid from filter media. A tube may be provided having a first and second end and disposed within the cylinder. The tube transfers the filtered fluid from the second end cap to the outlet disposed at the first end, and the tube is rigidly mounted at a first end and slidably mounted at the second end of the cylindrical cartridge. In a preferred form, the tube is rigidly affixed to the first end cap by heat welding and is slidably attached the second end that includes an O-ring to provide a desired seal between a chamber in the end cap and the filter media.

The present invention also provides a novel method of fabrication for the components for the cartridge assembly. A tube and a cylindrical cartridge housing are provided and fused to an end cap at a first end. The tube is provided in the cylindrical housing to bring fluid from the second end of the cartridge assembly to the first end. The tube is rigidly affixed to the cartridge assembly at the first end. At the second end, the end cap is fused to the cylindrical housing and the tube is sealingly engaged to the second end cap.

Objects and features of this invention will become apparent from the following detailed description when taken in connection with the accompanying drawings which disclose multiple embodiments of the invention. It is to be understood that the drawings are designed for the purposes of illustration only and are not intended as a definition of the limits of the invention.

DESCRIPTION OF THE DRAWINGS

The objects and advantages of the invention will be appreciated more fully from the following drawings in which:

FIGS. 10–13 illustrate steps of a representative connection method for joining the first end cap, fluid transfer tube and the cylinder;

DETAILED DESCRIPTION OF THE INVENTION

Figure 1:
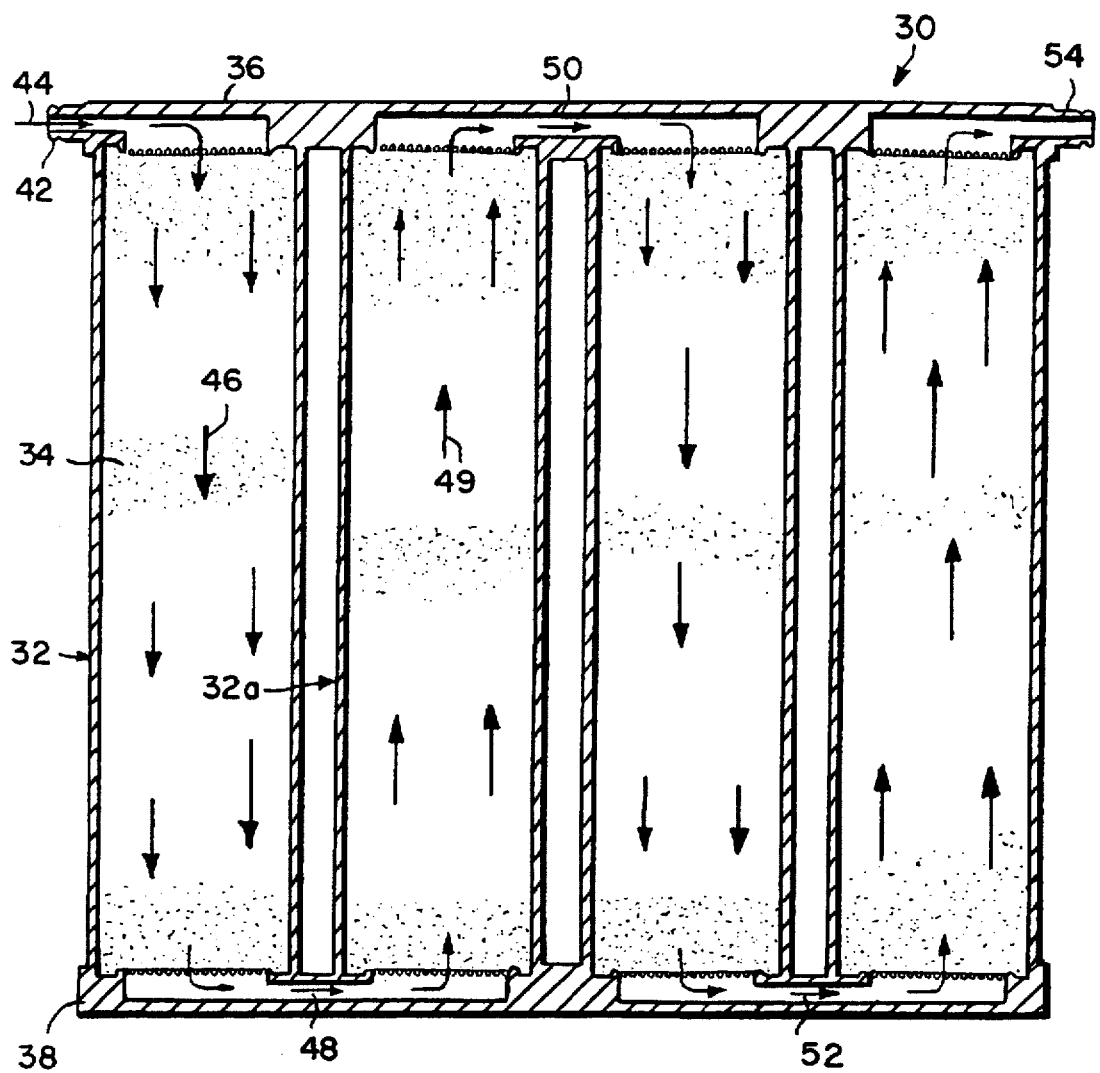
FIG. 1 illustrates a flow schematic of a conventional four tube cartridge having bi-directional serial flow through the four tubes.
Figure 2:
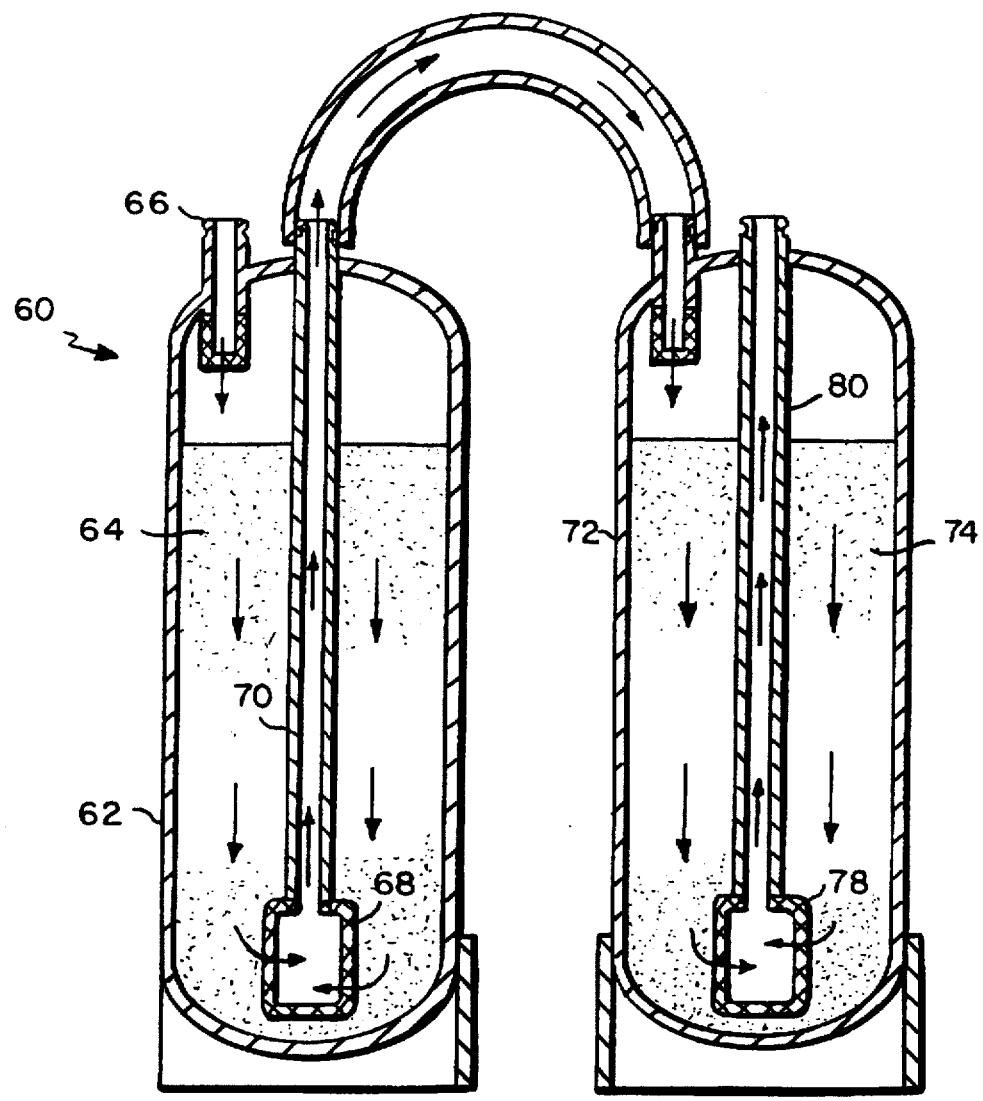
FIG. 2 illustrates a flow schematic of separable conventional cylinders which provide for uni-directional downward flow.
Figure 3A:
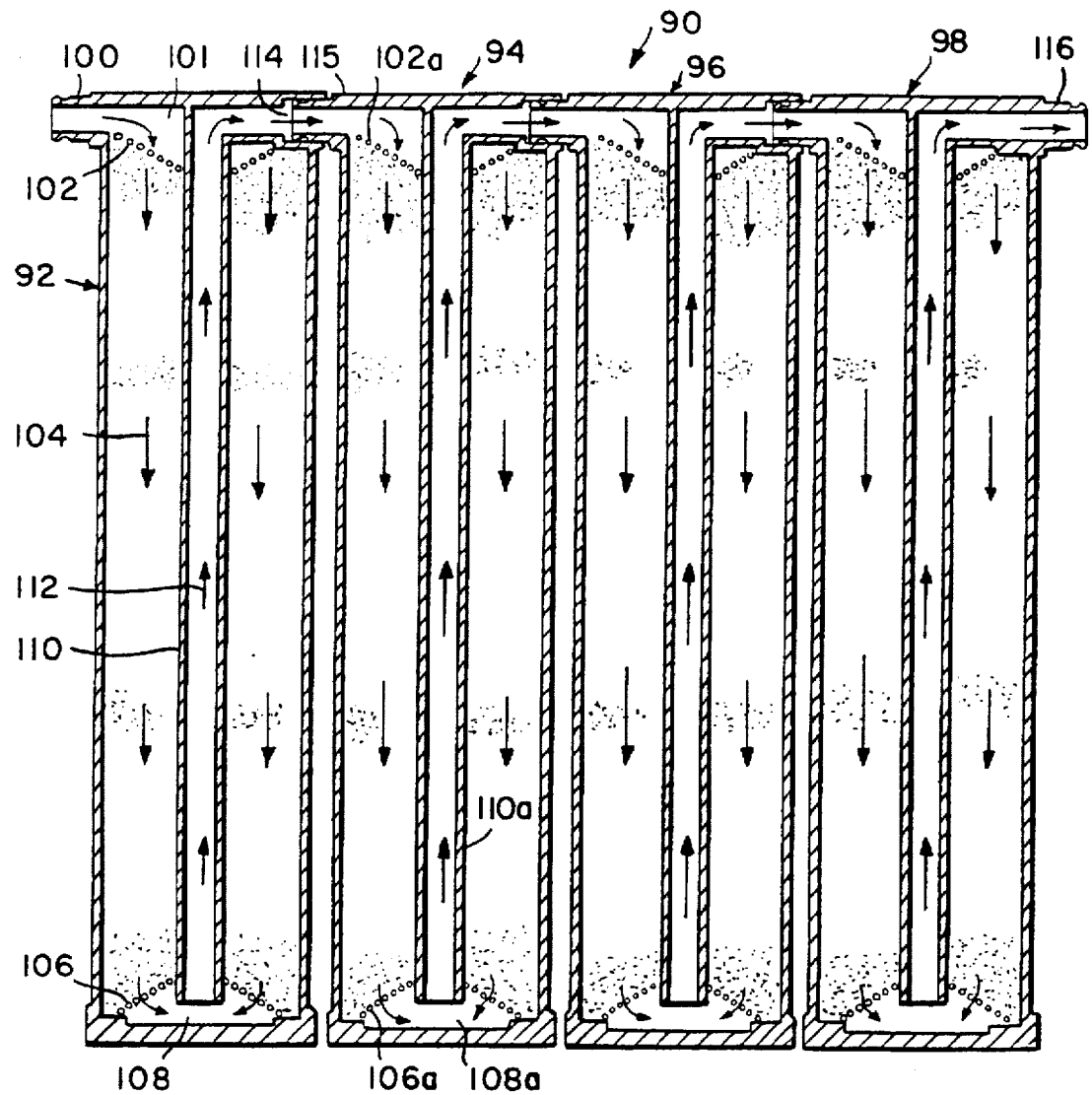
FIG. 3A illustrates a flow schematic of cartridge units in series with uni-directional flow through the water purification media.

The present invention provides a filter cartridge assembly having series uni-directional flow through filter media. Preferably, the flow is downward so that the filter media is forced down with gravity and fluidization of the filter media is prevented. The downward flow also provides for a more even flow distribution along an axial cross section of the cylinder. FIG. 3A is an illustrative flow schematic for the present invention. A cartridge assembly 90 includes several individual cartridge units 92, 94, 96 and 98 which are serially connected. Fluid flows from a fluid inlet port 100 into a cartridge inlet plenum 101. A fluid distribution cap 102 distributes the flow from the inlet plenum to the filter media in cartridge 92 and flows downward as indicated by arrow 104. At the lower end of the cartridge, another fluid distribution cap 106 separates the filter media from a lower plenum 108. Once in the lower plenum, the force of water flowing through the system moves the fluid upwardly into a liquid transfer tube 110 as indicated by arrows 112. Once the fluid reaches the top of the cartridge, the fluid is fed into the serially adjacent cartridge 94 through an outlet port 114. Because the fluid enters and exits at the top of the cartridge unit, the downward flow is repeated for each of the cartridge units resulting in a serial, uni-directional flow through the filter media.

As illustrated, the cartridge 92 has a "male" type inlet and a "female" type outlet. The cartridge 94, similarly, has a male inlet 115 which couples with the female outlet of cartridge 92. The construction of the cartridges 94 and 96 are similar to cartridge 92 and like reference characters with a post script "a" refer to like elements. As the fluid enters the cartridge 94 it flows down through a fluid distribution cap 102a into the filter media, down through the cap 106a to the plenum 108a, and up through the transfer tube 110a. A male inlet of cartridge unit 96 couples with the female outlet of cartridge unit 94. The fluid flows serially through the cartridges to outlet 116 where the final purified product is delivered. As shown, the outlet 116 is a male type outlet which (together with the inlet port) may be adapted to couple with the purification console (not shown). The various connectors may be modified as apparent to those skilled in the art. For example, the male and female type ports may be interchanged or other type ports may be provided. Additionally, O-rings may be provided in an annular groove on the male connection to form a seal.

In addition to reducing the likelihood of fluidizing the filter media, the downward flow also reduces the possibility that flow channels may form through the media. Channels form when the filter media has a vein or channel of decreased density that provides a path of least resistance through which fluid will flow. The formation of channels can substantially reduce the effectiveness of the filter media because the surface contact between the media and the water is reduced. The direct connection between the outlet of one cartridge to the inlet of another also minimizes the length of conduit through which the filtered fluid flows, and thus decreases the likelihood of contaminating the fluid with impurities in the conduit.

Finally, another advantage of the inventive filter cartridge assembly is that each cartridge unit 92, 94, 96 and 98 can be replaced individually without destroying or affecting the other cartridges. Since each cartridge unit may contain one or several different filter media, the service-life time for each cartridge unit may be different. Because each cartridge assembly is constructed of a plurality of self-contained cartridge units, one cartridge may be replaced without destroying the entire assembly. Further, specialized applications may require specialized fluid filter media, and because the cartridge assembly comprises several interchangeable units, any unit selected may be assembled together to form a specialized cartridge assembly.

Although FIG. 3A illustrates a fluid return tube in the center of the conduit, one skilled in the art will appreciate the variety of possible configurations. For example, the return tube could be disposed on the inside wall of the cylinder, or alternatively be concurrently formed with the cylinder in an extrusion process. Finally, the return tube cylinder could be an annular space formed by two concentric cylinders, with the inner cylinder filled with the filter media.

Figure 3B:
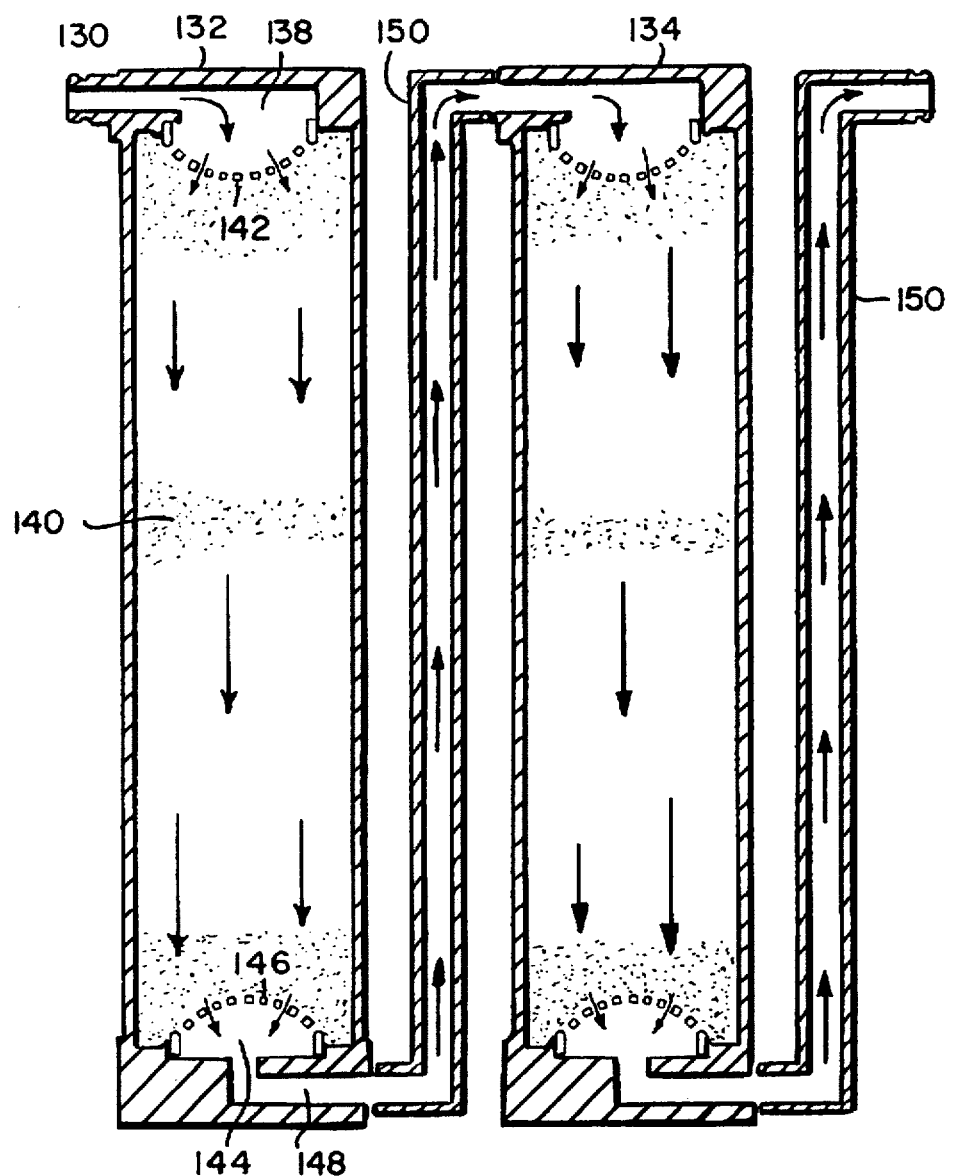
FIG. 3B illustrates a flow schematic of cartridges in series with downward flow through water purification media and a product transfer tube outside the cartridge housing.

FIG. 3B illustrates another schematic flow diagram of a cartridge assembly with unidirectional fluid flow through the filter media. In contrast to the embodiment shown in FIG. 3A, the fluid is transferred to a serially adjacent cartridge unit by a conduit that is outside the cartridge unit. In this embodiment a cartridge assembly 130 may include two cartridge units 132, 134. Similar to FIG. 3A, an inlet port 136 leads to a plenum 138 and into a fluid filter media 140 through a conical fluid distribution plate 142. The plate 142 separates the media from the plenum 138. At the lower end of cartridge 132, the filter media is separated from a lower plenum 144 by a conical plate 146. The lower end of the cartridge includes a passage 148 to a fluid transfer tube 150 which leads to the serially adjacent cartridge 134 where the fluid passes through another filter media. Another fluid transfer tube 150 leads to either another cartridge unit (not shown) or the purification console (also not shown).

This embodiment also provides the advantage of a downward flow for the fluid through the fluid filter media. One advantage of the external product transfer tube may be that the cartridges are easier to manufacture. Additionally, the surface area of the filter media is maximized because the fluid transfer tube 150 does not occupy any of the volume within the cartridge unit. This embodiment is modular in that each filter cartridge unit may be configured in the same manner and easily and conveniently installed within a console. Accordingly, the number of cartridge units may be increased and varied depending on the particular needs of a system. Additionally, since the fluid is transferred outside the cartridge unit, contamination of fluid that has been filtered should not be a problem.

However, when the transfer tube is located within the cartridge unit as illustrated in FIG. 3A, the contamination of fluid as it flows through the cartridge assembly must be considered. With reference to FIG. 3A, when the fluid has been purified through a filter media, and is in the upper part of the cartridge unit flowing toward the outlet port, the water that has been run through the cartridge unit is in close proximity to the water entering the cartridge unit, and any cross-contamination renders the filter cartridge less effective. Accordingly, the present invention provides a tight seal between the fluid transfer tube and the upper portion of the cartridge unit. As more particularly described below, the seal may be created by heat welding, adhesives or other suitable connection processes as recognized by those skilled in the art.

At the lower end of the cartridge, the qualitative difference in the purity of the fluid in the tube and the fluid that is collected in the plate is not substantial, and thus the elusiveness of the seal is not as critical. However, the tube must fit snugly within the plate so that the filter media does not enter into the plenum. Accordingly, a different seal is provided at the lower end of the cartridge unit. The different seal performs well and enables the cartridge unit to be manufactured easier and quicker with the high performance found in other, more expensive devices.

Figures 4A, 4B:
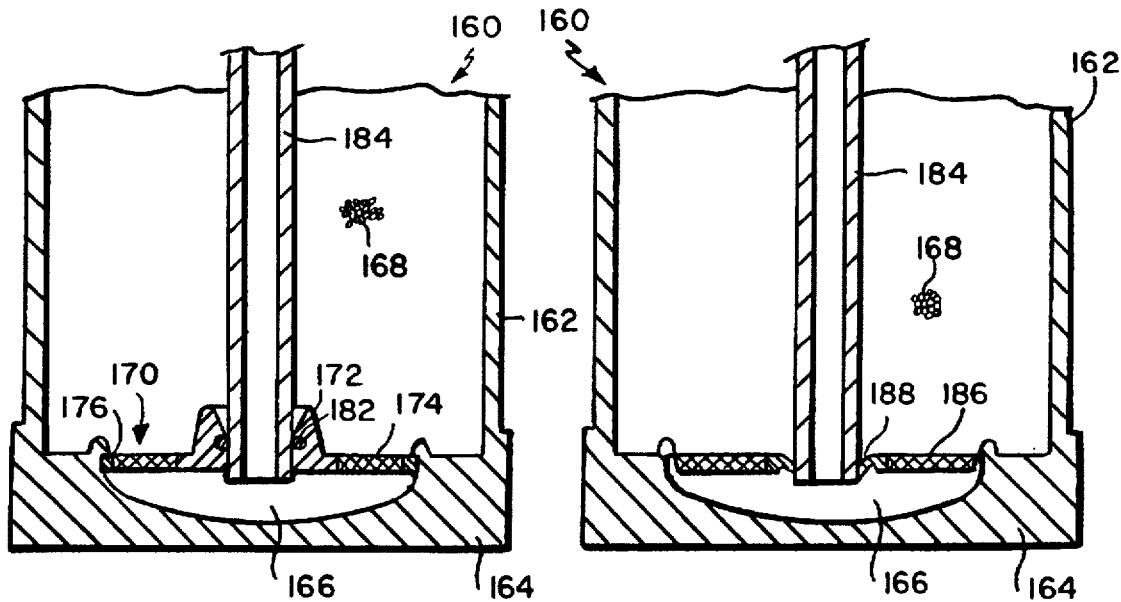
FIGS. 4A, 4B and 4C are detail views of the bottom of a cartridge that illustrate varied seal connections with the lower cap.
Figure 4C:
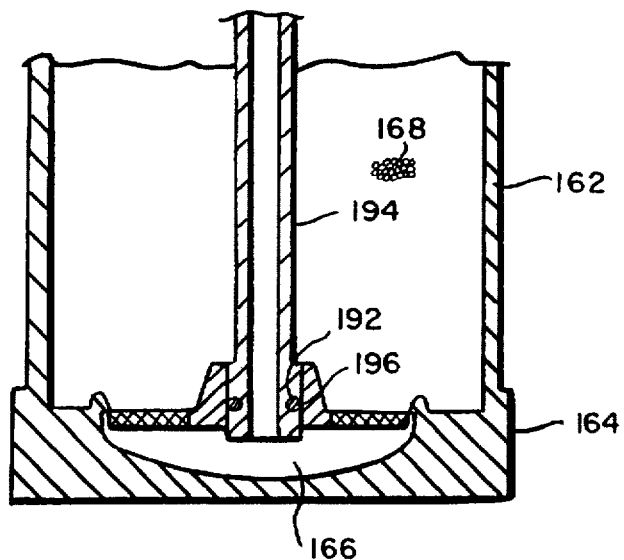

FIGS. 4A, 4B, and 4C provide various alternative embodiments for sealing the lower end of a fluid transfer tube 184 and the bottom collection plate 170. For reasons which are more fully described below, the seal provided at the bottom plate enables axial movement of the tube with respect to the collection plate. With reference to FIG. 4A, a cartridge unit 160 includes a cylindrical side wall 162 and a bottom 164. The cartridge may be one piece or formed from several different pieces. The bottom of the cartridge unit includes a plenum 166 which is separated from fluid filter media 168 by the annular plate 170.

The plate 170 includes a hub 172, a porous portion 174 and an outer ring 176. The outer ring is adapted to snap into the bottom 164 and be retained therein. In another embodiment, the porous portion may snap directly into the bottom 164. The porous portion of the plate may be slitted or perforated. Preferably, the perforation or slits should be sized so that particles which are larger than 300 μm (0.012 inch) will not pass through. The relative advantages of various hole sizes and shapes should be apparent to those skilled in the art based on the fluid filter media. At the inner cylindrical surface of the hub, an annular groove is formed into which an O-ring 182 is placed. The annular chamber and O-ring are sized such that the O-ring creates a seal between the tube 184 and the hub 172 of the plate when the tube is inserted into the hub 172. The tube is able to move axially up and down with respect to the plate and thus, the assembly of the parts is facilitated.

FIG. 4B provides an alternate embodiment of the seal between the tube 184 and the plate. Similar to the previously described embodiment, a plate 186 is seated on the wall 164 of the cartridge unit and a porous material separates the fluid filter media 168 and plenum 166. The inner surface of the hub includes a wiper lip 188 which seals the interface between the tube and the plate. The wiper lip is an annular ring of thin, flexible plastic material. The lip may be integrally formed with the plate or, alternatively, the lip may be affixed on the plate prior to assembling the cartridge. The lip provides for a fluid tight seal while allowing relative motion between the plate and the tube.

With reference to FIG. 4C, a third alternative for the seal between the plate and the tube is achieved by providing an annular groove 192 in the tube 194 into which an O-ring 196 is disposed. The O-ring is large enough to seal the tube and plate while still allowing relative movement therebetween. Each embodiment that enables relative motion between the tube and plate provides a structure which facilitates the precise and reliable manufacture of the cartridge units and assemblies.

Figure 5:
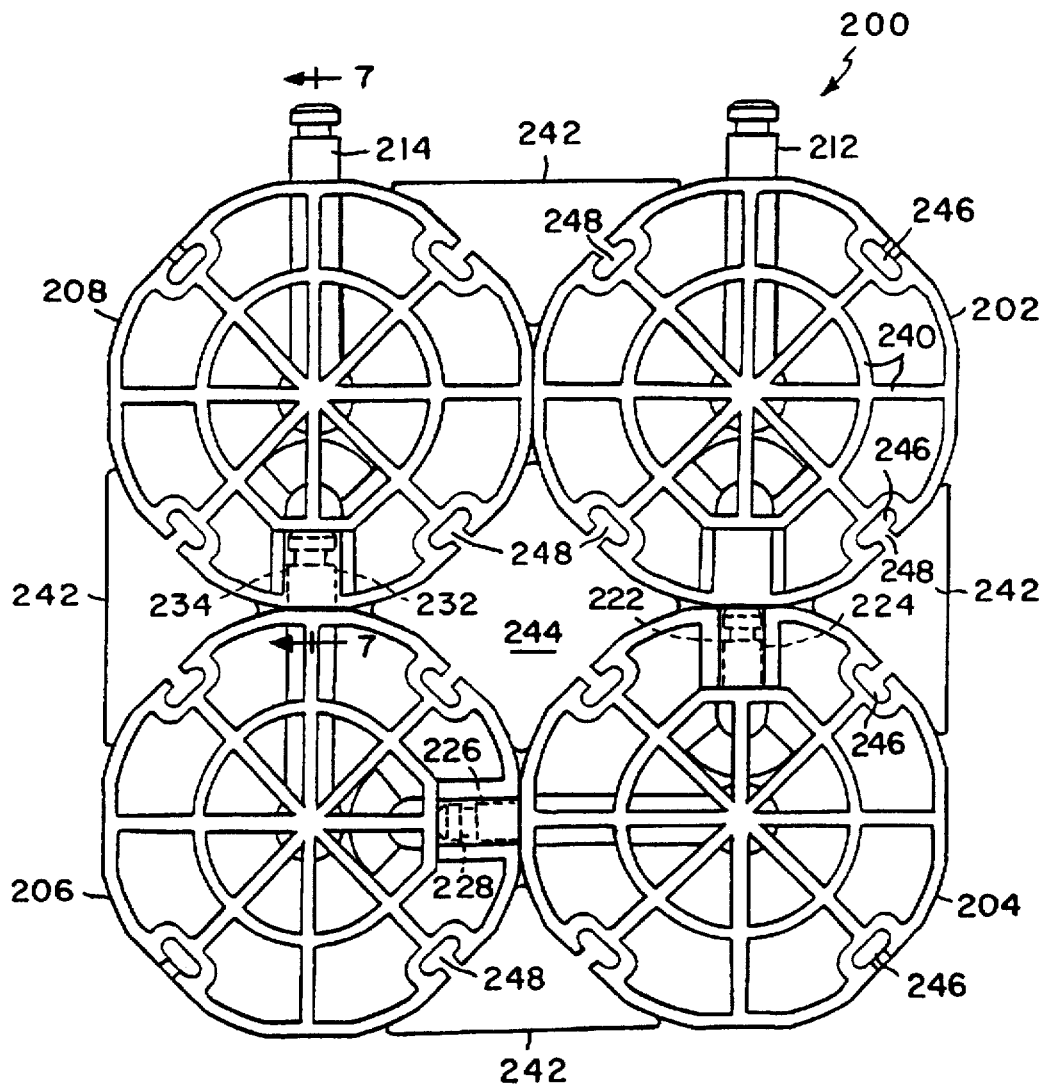
FIG. 5 illustrates a top view of a cartridge assembly according to the present invention.
Figure 6:
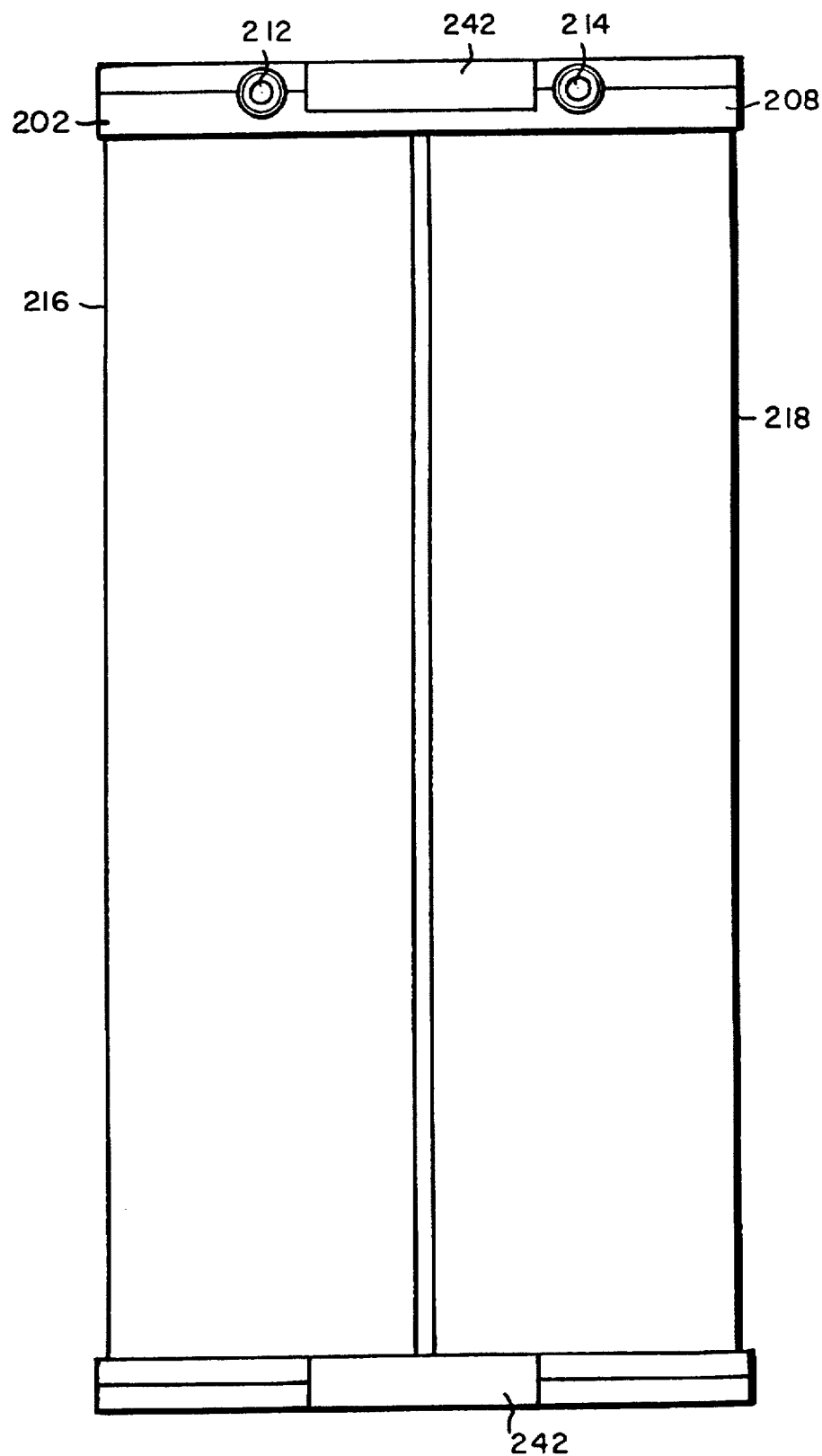
FIG. 6 illustrates a front view of the cartridge assembly of the present invention.

In a preferred form, as illustrated in FIG. 5, four cartridges units comprise the cartridge assembly indicated by 200. In this embodiment, top caps 202, 204, 206 and 208 are arranged to form a square modular cartridge assembly which can be easily handled. Inlet 212 and outlet 214 are each provided on the top of the container and face the same direction. FIG. 6 shows a front view of the cartridge assembly. The direction of the inlet and outlet ports provide a suitable interface with a corresponding portion of the purification console (not shown). Annular grooves may be provided on the ports to receive O-rings so that fluid leakage at the interface with the console is minimized. As illustrated in FIG. 6, the top caps 202, 208 are illustrated on the top of the cartridge units 216, 218 respectively.

The various connections between the top caps of the cartridge units provide for the serial downward flow. Cap 202 receives the fluid through the male inlet 212. The fluid is purified in the cartridge in the manner described above in connection with FIG. 3A and the top plate is also provided with male outlet 222 (shown in phantom) which is oriented 180° opposite from the inlet. The male outlet couples with a female inlet 224 (shown in phantom) in the serially adjacent end cap 204. Once the fluid has passed through the fluid media it passes through a male outlet port 226 (shown in phantom) into the serially adjacent cartridge by a female inlet 228 (shown in phantom). As illustrated in FIG. 5, the female outlet port 226 is 90 degrees offset from the inlet port of the cap 204.

Once the fluid returns to the end cap 206 by the transfer tube (not shown), the fluid exits through male outlet port 232 (shown in phantom) and is received by the female inlet port 234 (shown in phantom) of the cap 208. The ports of cap 206 may be configured identically to the ports of cap 204. Accordingly, all the fluid communication required for the transfer through all the cartridge units occurs in the caps at one end of the unit. Because downward flow is typically preferable, in the embodiment shown, the connections are at the top plates.

Preferably, the end caps 202, 204, 206 and 208 are molded and formed from high purity plastic, such as polypropylene. The end caps may include ribs 240 which provide for increased structural rigidity. The ribs may extend radially from the center of the plate and may also include concentric circular ribs.

As will be apparent to those skilled in the art, the cartridge assembly can be constructed to contain more than four cartridge units. Cartridge end cap 208 is provided with a female inlet and a male outlet that are oriented in a straight line. Any number of cartridge units that have such a configuration may be disposed between end caps 202 and 204, and additionally between end caps 206 and 208. Thus, the cartridge assembly can contain as many different cartridge units as required to effectively purify the fluid.

With continued reference to FIG. 5, a plurality of clips 242 and 244 are provided between the end caps to give the cartridge assembly structural integrity so that it may be installed and removed without inconvenience. The end caps 202, 204, 206, 208 each include four clip receiving sockets 246 spaced 90 degrees apart. With continued reference to FIG. 5, a plurality of side clips 242 have a generally triangular shape and are disposed between the caps 202, 204; 204, 206; 206, 208 and 208, 202 respectively. The clips 242 each have protrusions 248 which are received in the sockets 246. The clip 244 has 4 lateral sides and is centrally located between the four end caps and engages each one by protrusions 248 that are received by the sockets 246.

Each clip is readily removable and may be reattached when necessary. For example, if one filter cartridge were to become spent, the clips could be removed from the end cap and the cartridge unit replaced by an individual fresh unit and then the cartridge assembly may be assembled by reattaching the clips. Accordingly, the life of any cartridge assembly can be extended for a much longer duration than the prior art. In other cartridge assemblies of the prior art, Gaignet for example, once one filter cartridge unit was spent, the whole pack or assembly is discarded. With the present invention, the maximum life of each unit is achieved. Thus, the present invention provides a cartridge pack assembly which has a significant advantage over the prior art. The connection between cartridge units is more specifically described in co-pending application No. 08/599, 259, entitled "Modular Filtering System and Method of Assembly", filed concurrently with this application on Feb. 9, 1996, and such disclosure is incorporated by reference herein.

Figure 7:
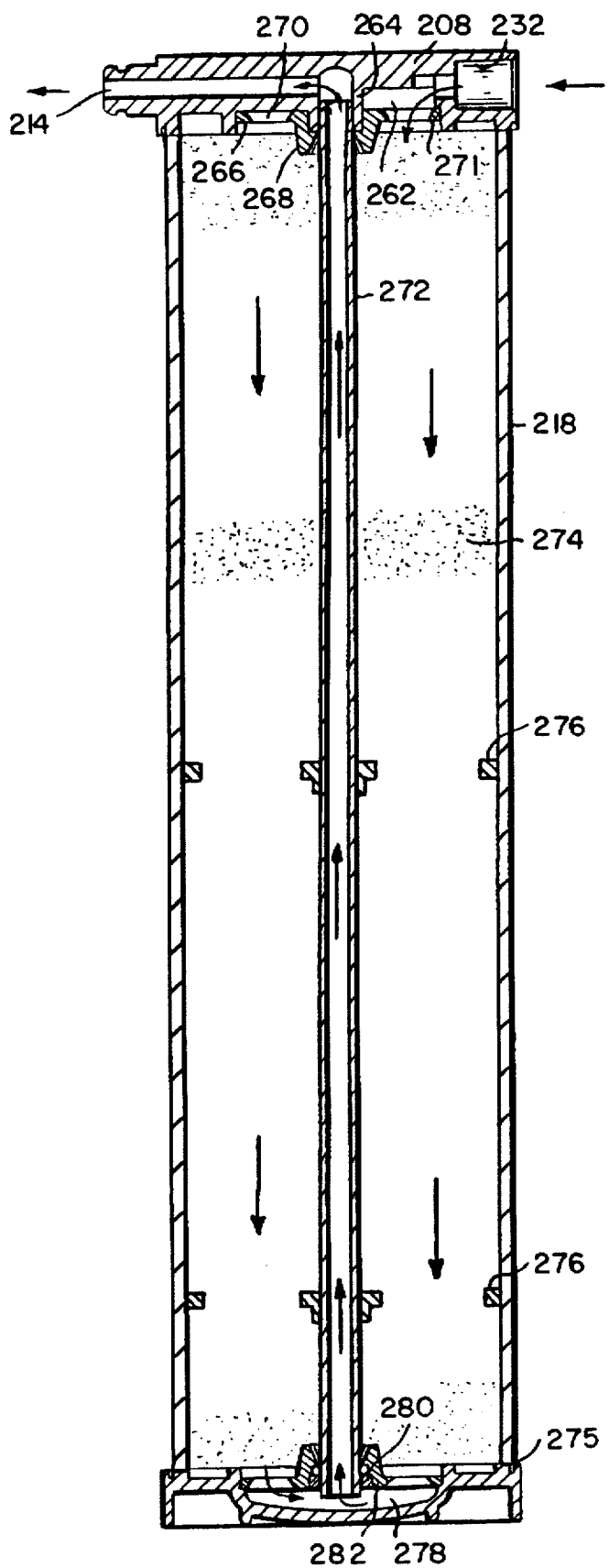
FIG. 7 illustrates the flow path of a representative cartridge unit of the present invention and is a sectional view taken along section line 7—7 of FIG. 5.

FIG. 7 illustrates a cross-sectional view of one preferred embodiment of the cartridge 218 shown in FIGS. 5 and 6. The top cap 208 includes the female inlet port 232 which leads into a generally cylindrical plenum 262. The end plate includes a hub 264 onto which a flow distributor 266 is placed. The flow distributor also has a hub 268 which is centrally located on the flow distributor. Preferably, the flow distributor, also shown in FIG. 8A, includes a plurality of radially extending slots 270 which extend from the hub. Each flow distributor includes an outer rim which retains the flow distributor in the end cap. The radial slots 270 extend to an annular rim 271 that secure the flow distributor to the end cap. A flow transfer tube 272 is securely attached to the flow distributor and the end cap.

The cartridge is filled with fluid filter media 274 which may include several layers. The flow transfer tube 272 is secured against radial movement by center support rings 276. At the lower end of the filter cartridge, a bottom flat distributor (configured identically to the top flow distributor) secures the flow transfer tube 272 against radial motion at its end. The bottom flow distributor also separates the fluid filter media from a bottom plenum 278. The flow distributor is mounted on a bottom end cap 275. The fluid transfer tube is sealed with respect to the flow distributor by an O-ring 280 which is secured in place by a retainer ring 282.

Thus, the fluid enters the cartridge unit by an inlet port and enters into a plenum in the upper plate which is separated from the fluid filter media by a flow distributor. The flow distributor also provides for an even distribution of fluid along the circular cross-section of the filter material. As the fluid travels downward, the various contaminants are removed from the fluid. When the fluid reaches the bottom cap, a flow distributor again separates the purification media from the plenum and the fluid flows up through the fluid transfer tube to the upper cap and out of the cartridge unit via the outlet port. Several cartridge units may be placed together to form a cartridge assembly.

Figures 8A, 8B, 8C:
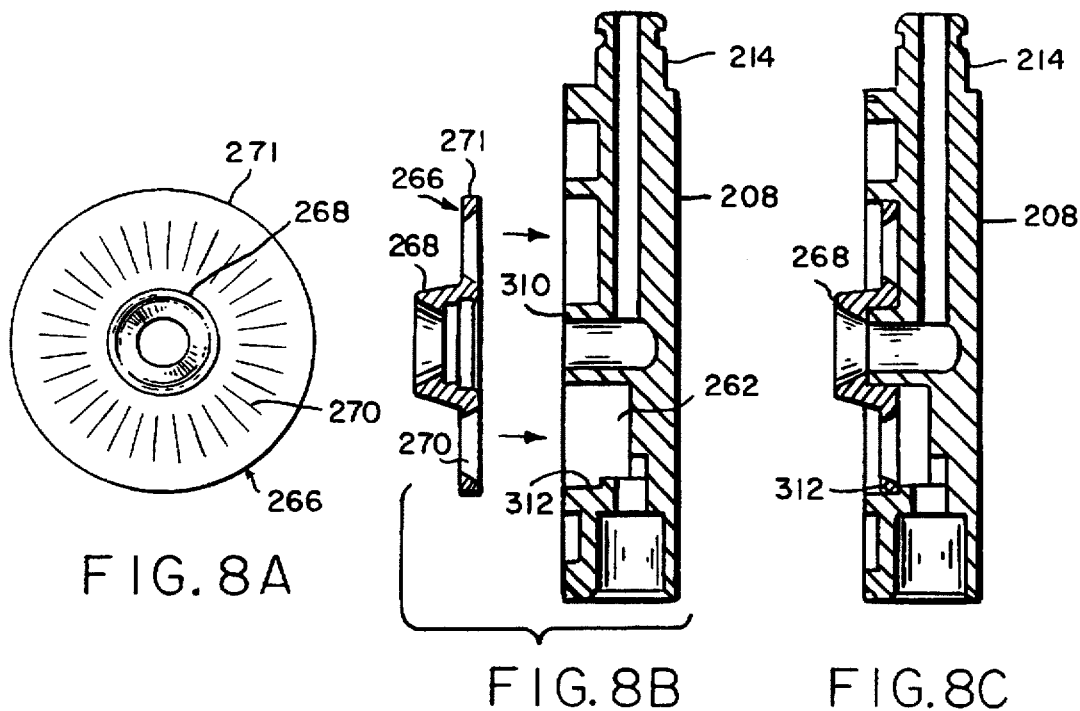
FIG. 8A illustrates the flow distributor of the present invention.
FIGS. 8B and 8C illustrate the flow distributor and end cap at the first end as separate parts and assembled, respectively.

The method of construction for a representative cartridge unit is described below in connection with FIGS. 8A through FIG. 19. The flow distributor 266 is illustrated in FIGS. 8A and 8B. The hub 268 and the rim 271 are configured to increase the versatility of the flow distributor 266, and the same flow distributor is used for the top and bottom cap. One specific versatile aspect of the design configuration is that the inner facing surface of the hub is configured to be able to accommodate two different sealing modes. On the upper cap, as described more particularly below, the fluid transfer tube is rigidly sealed to the internal surface of the hub and upper cap so that a tight seal is created. At the lower cap the flow distributor is adapted to receive an O-ring that provides a seal between the flow distributor and the fluid transfer tube. As illustrated in FIGS. 7 and 8B, the cap 208 includes a plenum 262 which is sized to receive the flow distributor. More particularly, the flow distributor hub includes an axial inner space which is sized to pass over an annular protrusion 310 of the cap 208. Additionally, the ring of the flow distributor is snapped into secure engagement with a recess and rigid lip 312 as illustrated in FIG. 8C. Preferably, the flow distributor is pre-molded and is inserted into the cap immediately after the cap is molded and still warm. Thus, the annular groove and lip 312 is disposed to securely receive the ring of the flow distributor. Once the flow distributor is in place on the cap, the upper cap assembly is prepared for final assembly.

Figures 9A, 9B:
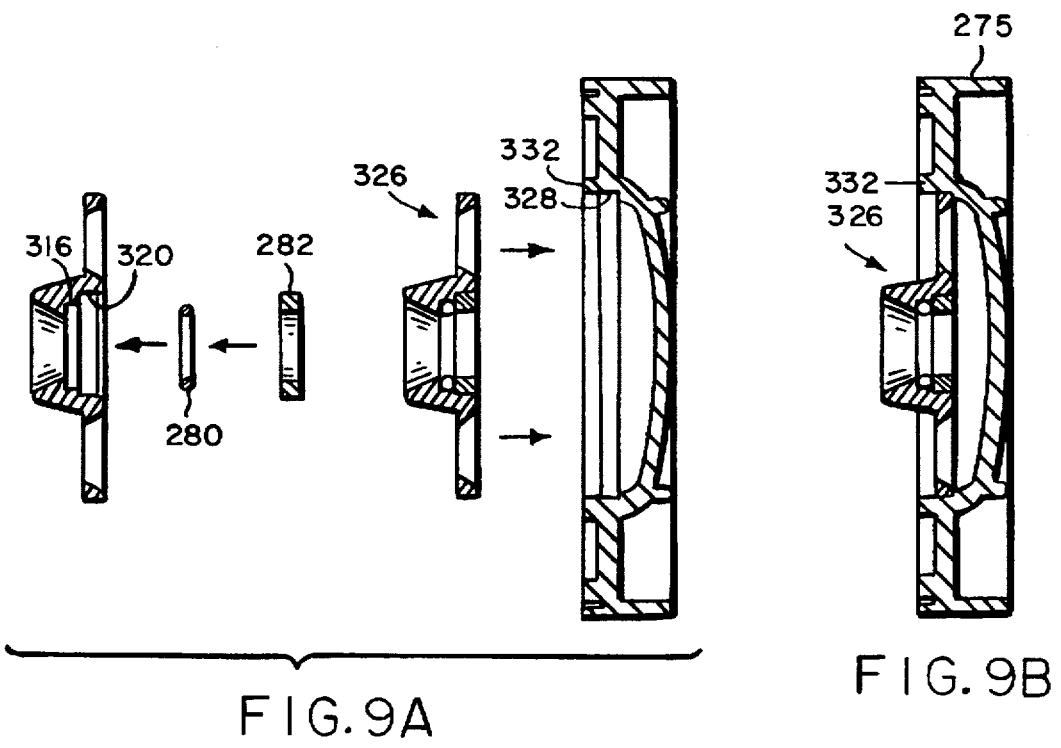
FIGS. 9A and 9B illustrate the flow distributor and end cap at the second end as separate parts and assembled, respectively.

FIGS. 9A and 9B illustrate a representative method of assembly for the lower cap of a cartridge unit. While it should be recognized that the configuration of the upper cap may vary as discussed in connection with FIG. 5, the lower cap is essentially the same for each of the cartridge units. As illustrated in FIG. 9A, the inner surface of the hub on the fluid distributor has a stepped annular surface with two steps 316 and 320. The O-ring 280 is inserted into the stepped surface 316. The retaining ring 282 is press fit into the defined annular space stepped surface 320 to secure the O-ring into the flow distributor. Once the flow distributor assembly indicated generally by 326 is prepared, it is snapped into the bottom cap in a manner similar to the top cap as shown in FIG. 9B. Particularly, there is an annular groove 328 which receives the outer ring of the flow distributor. An annular lip 332 secures the flow distributor from movement on the cap. Once the bottom cap assembly is prepared, the cartridge unit is ready for final assembly.

Figure 10:
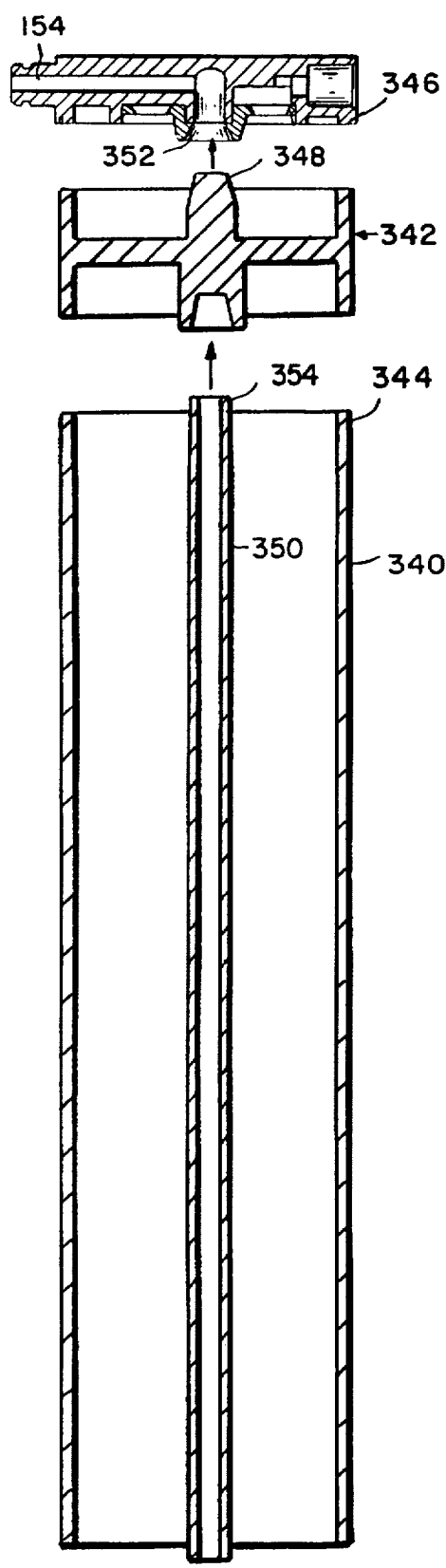
Figure 11:
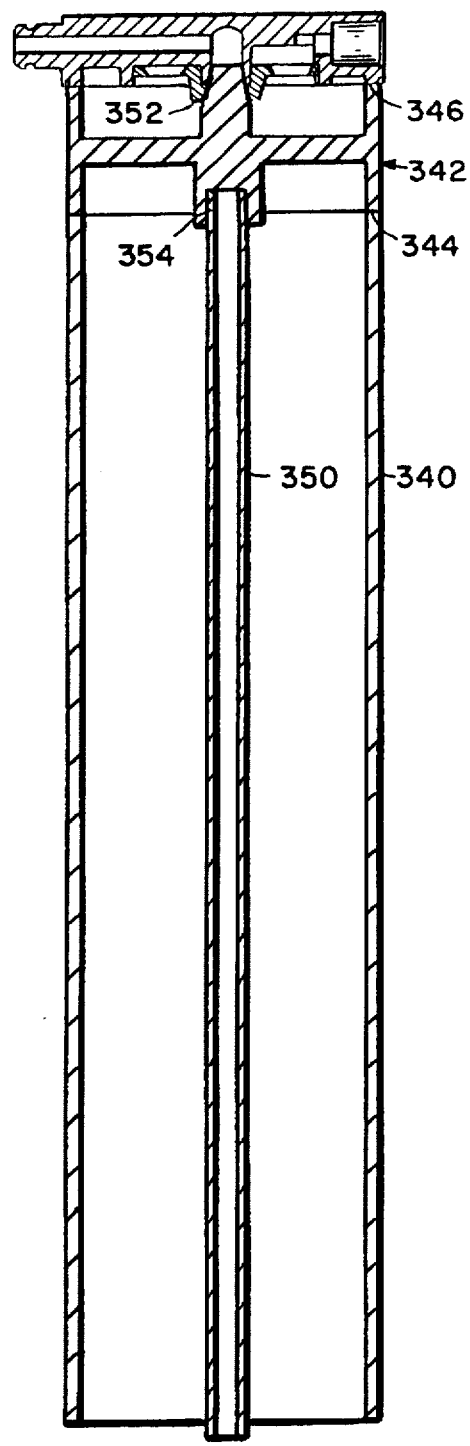

FIGS. 10–19 illustrate the various steps of final assembly of a representative cartridge unit. With reference to FIG. 10, a cylindrical outer tube 340 is provided and secured on a jig (not shown). A fluid transfer tube 350 is provided at a length which is slightly longer than the tube 340. It too is secured on the jig (not shown). A cylindrical heating element 342 shown in cross-section, is configured to join the upper cap to each of the cylinder and the tube. The heating element partially melts the annular surface of the edge of the tube 344 and an annular surface 346 of the end cap. Additionally, a protrusion 348 is configured to heat and partially melt the annular surface 352 of the passage leading to the outlet 154. Finally, the heating element is configured to heat and partially melt the upper annular surface of the fluid transfer tube at 354. As illustrated in FIG. 11, the end cap and the tubes are placed in contact with the hot plate to partially melt the contact surfaces. As illustrated in FIG. 12, the various parts, once heated, are separated from the heating plate 342, and the heating plate is removed as illustrated in FIG. 12. As illustrated in FIG. 13, the end cap is placed in contact with the tube and the fluid transfer tube. The surfaces 352, 354 on the end cap and tube, respectively, and the surfaces 346, 344 on the cylinder and the end cap, respectively, are then compressed and held together while cooling. Thus, the fluid transfer tube is heat sealed to the end cap and a secure connection is provided. This prevents cross-contamination of the fluid as it enters and leaves the fluid container. Of course, other joining methods could be used.

Figure 14:
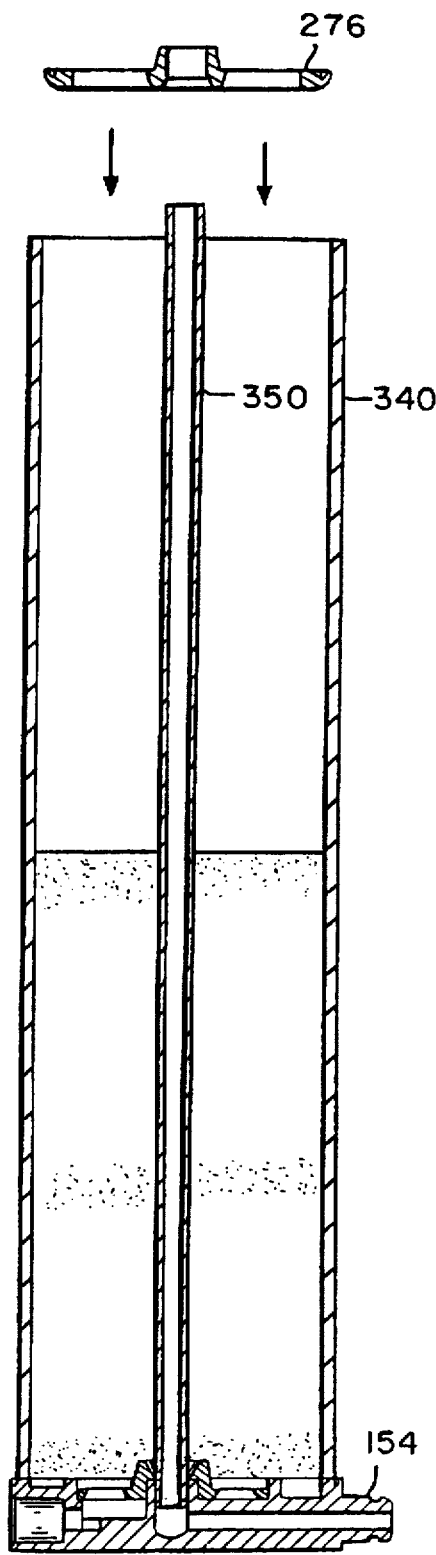
FIGS. 14–15 illustrate the steps of filling the cylinder with filter media.
Figure 15:
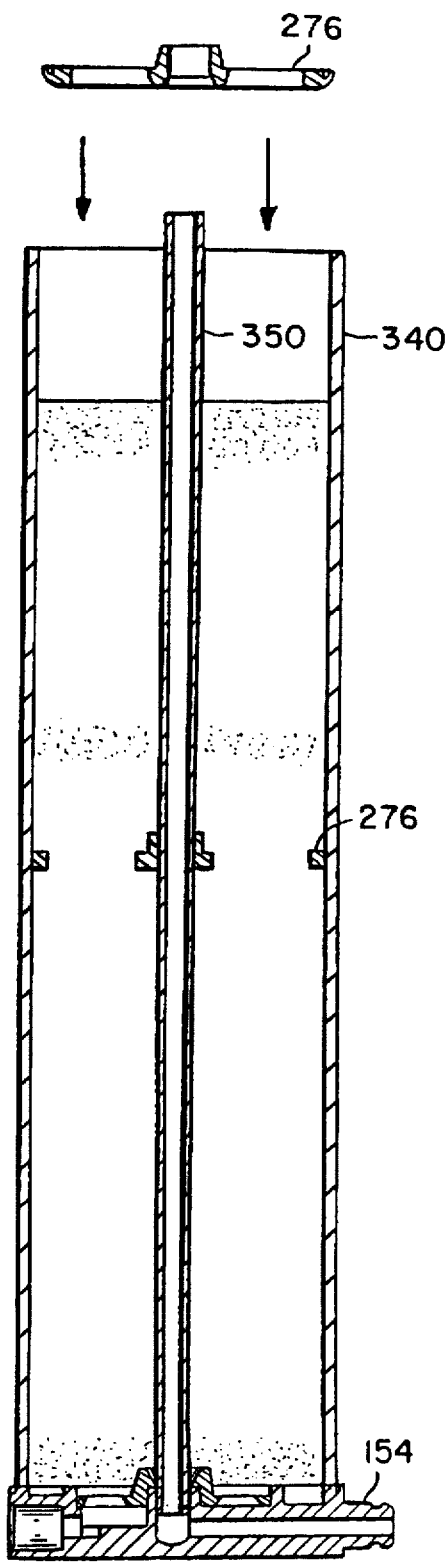

FIG. 14 illustrates the filling step of the cartridge. The cartridge is inverted and filter media is placed in the cartridge to approxiatmely 50% of working capacity. The center tube support ring 276 is then slidably inserted on the tube. The ring is able to ride along the inner surface of the tube and the outer surface of the fluid transfer tube. It is desired that the support ring be able to "ride" within the tube so that expansion and contraction of the fluid purification media will not cause the support ring to break and so that the filter media is maintained in an unmixed state (if desired). Once the center tube support ring 276 is in place, more media is placed in the tube as illustrated in FIG. 15. Once 90% of the tube is filled with media, a second center tube support ring 276 is placed in the cartridge.

Figure 16:
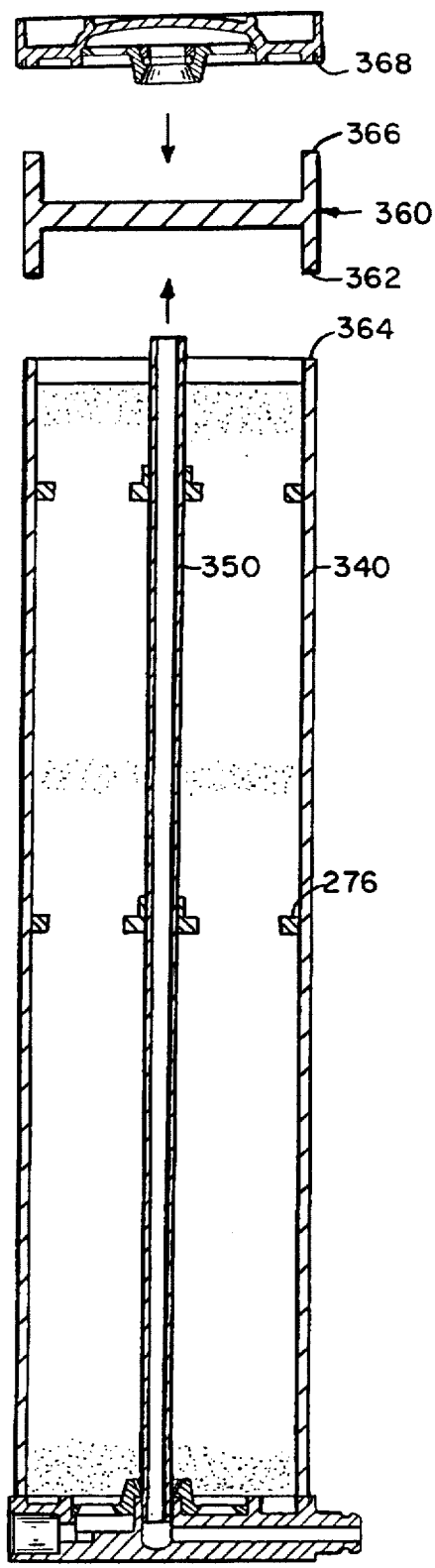
FIGS. 16–19 illustrate steps of a representative connection method for joining the second end cap, fluid transfer tube and the cylinder.
Figure 17:
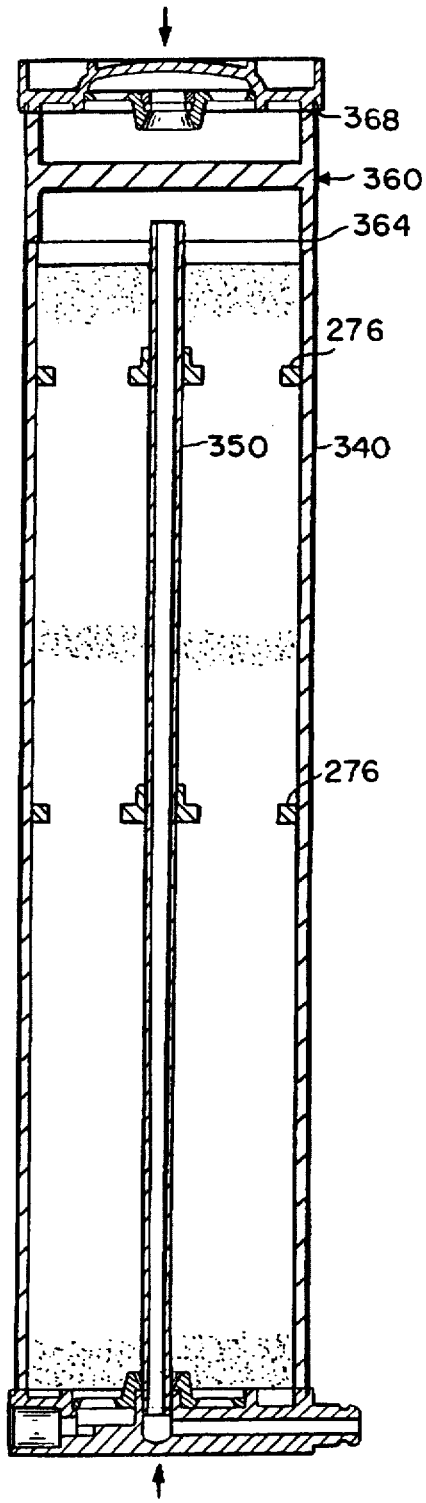
Figure 18:
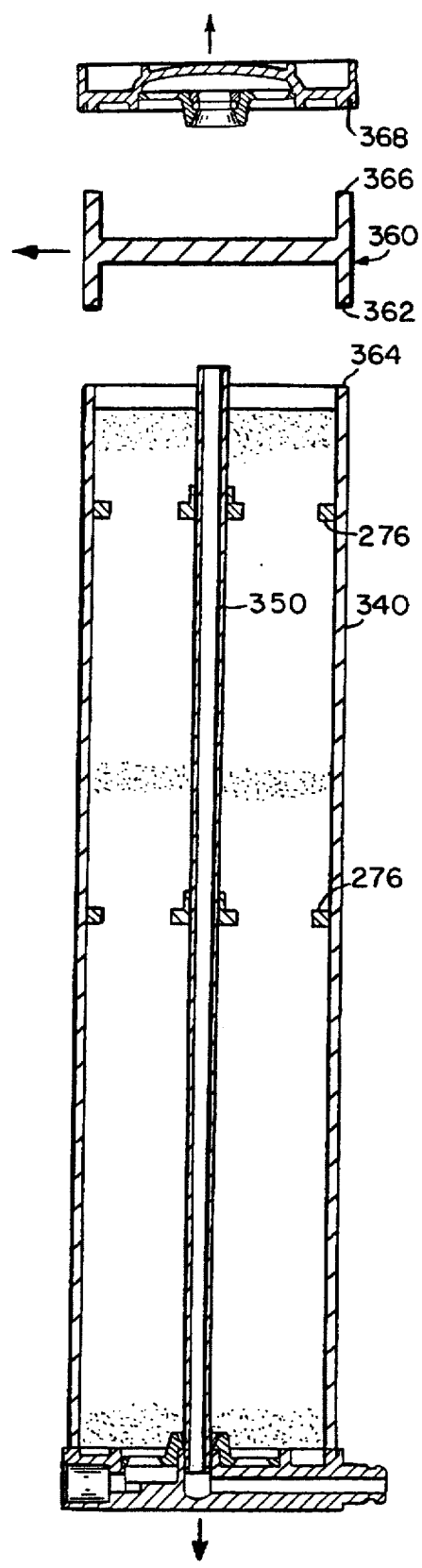

Finally, as illustrated in FIG. 16, the remaining working volume of the cartridge is filled and the bottom cap is prepared to be bonded to the tube. As illustrated in FIG. 16, a hot plate 360 has an annular surface 362 adapted to contact the annular surface of the tube 364. Additionally, the hot plate 360 has an annular surface 366 adapted to contact the annular rim 368 of the top cap. Once the various parts are aligned in a jig (not shown), the hot plate bonding of the bottom cap assembly occurs by contacting the respective areas with the hot plate as illustrated in FIG. 17. Thus, the plastic is melted a sufficient amount.

Figure 19:
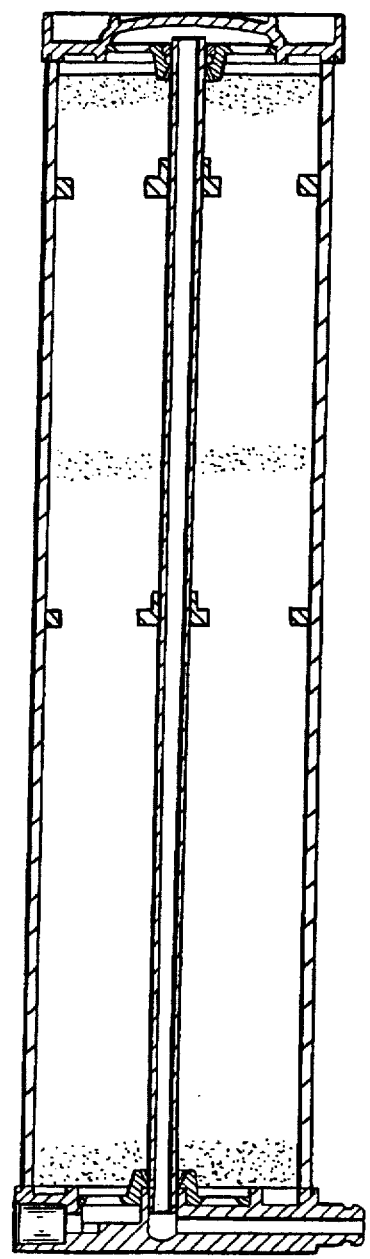

Once a sufficient amount of plastic has melted, the various parts are separated and the heater is moved out of the way and, as illustrated in FIG. 19, the cap is slid onto the outer tubing. The cap and the outer tubing are compressed and held together while cooling. When the cap is being placed on the outer tube, the inner tube is aligned with the inner surface of the hub and the O-ring mounted in the fluid distributor contacts the tube to provide the seal. Once the cartridge unit is constructed, it is inverted and ready for either final manufacturing into a cartridge assembly or as a replacement unit.

It should be understood that the foregoing description of the invention is intended merely to be illustrative thereof and that other equivalents, embodiments and modifications of the invention may be apparent to those skilled in the art. For example, the various inlets and outlets for the containers may be located on an axially central portion of a filter cartridge. Alternatively, the end caps could be provided with a different configuration.

What is claimed is:

1. An apparatus for purifying a fluid comprising:
   a cylindrical element having two ends, the cylindrical element containing a filter media,
   a first end cap disposed on one end of the cylindrical element, the first end cap including a fluid inlet port, a fluid outlet port, and a first fluid distributor,
   a second end cap disposed on a second end of the cylindrical element, the second end cap including a product collection plenum, and a second fluid distributor that separates the filter media from the product collection plenum, the second fluid distributor including an annular plate having a hub, a porous portion and an outer ring, and
   a liquid transfer tube disposed within the cylindrical element and extending from the product collection plenum to the fluid outlet port, wherein the liquid transfer tube is slidably mounted in the hub of the annular plate and further extends into the product collection plenum.

2. The apparatus of claim 1, wherein the first fluid distributor includes passages that substantially evenly distribute the fluid into the filter media.

3. The apparatus of claim 1, wherein the porous portion of the annular plate includes passages that allow fluid and prevent filter media to enter the product collection plenum.

4. The apparatus of claim 3, wherein the passages of the porous portion of the annular plate are sized to prevent filter media larger than 300 μm from entering the plenum.

5. An apparatus for purifying fluid comprising:
   a cylindrical element having two ends, the cylindrical element containing a filter media,
   a first end cap disposed on one end of the cylindrical element, the first end cap including a fluid inlet port, a fluid outlet port, and a first fluid distributor,
   a second end cap disposed on a second end of the cylindrical element, the second end cap including a product collection plenum, and
   a liquid transfer tube having a first and second end disposed within the cylinder and extending from the second end cap plenum to the fluid outlet port, the liquid transfer tube being rigidly mounted at the first end to the first end cap and slidably mounted at the second end to the second end cap, whereby fluid at the inlet port is prevented from mixing with fluid at the outlet port.

6. A modular filter cartridge assembly for purifying a fluid, comprising:

a plurality of filter cartridge units, each unit comprising:

a cylindrical element having two ends, the cylindrical element containing a filter media, a first end cap disposed on one end of the cylindrical element, the first end cap including a fluid inlet port, a fluid outlet port, and a first fluid distributor, a second end cap disposed on a second end of the cylindrical element, the second end cap including a product collection plenum, and a second fluid distributor that separates the filter media from the product collection plenum, and a liquid transfer tube having a first and second end disposed within the cylindrical element and extending from the product collection plenum of the second end cap to the fluid outlet port, the liquid transfer tube being rigidly mounted at the first end to the first end cap and slidably mounted at the second end to the second end cap, whereby fluid at the inlet port is prevented from mixing with fluid at the fluid outlet port, wherein the filter cartridge units are connected in series.

* * * * *